(12) United States Patent
Mabuchi

(10) Patent No.: US 10,101,737 B2
(45) Date of Patent: Oct. 16, 2018

(54) REMOTE OPERATION SYSTEM, VEHICLE, AND REMOTE OPERATION APPARATUS

(71) Applicant: TOYOTA JIDOSHA KABUSHIKI KAISHA, Toyota-shi, Aichi-ken (JP)

(72) Inventor: Mitsuhiro Mabuchi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 108 days.

(21) Appl. No.: 15/423,756

(22) Filed: Feb. 3, 2017

(65) Prior Publication Data

US 2017/0255195 A1    Sep. 7, 2017

(30) Foreign Application Priority Data

Mar. 4, 2016  (JP) .................................. 2016-042382

(51) Int. Cl.
  *G05D 1/00*   (2006.01)
  *H04N 7/18*   (2006.01)
(52) U.S. Cl.
  CPC ......... *G05D 1/0016* (2013.01); *G05D 1/0022* (2013.01); *G05D 1/0038* (2013.01); *H04N 7/185* (2013.01); *G05D 2201/0213* (2013.01)
(58) Field of Classification Search
  CPC .. G05D 1/0016; G05D 1/0022; G05D 1/0038; G05D 2201/0213; H04N 7/185
  See application file for complete search history.

(56) References Cited

U.S. PATENT DOCUMENTS

| | | | |
|---|---|---|---|
| 9,164,506 B1* | 10/2015 | Zang ................... | G05D 1/0038 |
| 2012/0105634 A1* | 5/2012 | Meidan .............. | G08B 13/1965 348/143 |
| 2014/0327770 A1* | 11/2014 | Wagreich ............. | G05D 1/0038 348/148 |
| 2015/0070503 A1* | 3/2015 | Kraeling ............ | H04N 5/23203 348/148 |
| 2015/0341540 A1* | 11/2015 | Kim ................... | H04N 5/23203 348/144 |
| 2016/0142613 A1* | 5/2016 | Brav .................. | H04N 5/23206 348/211.3 |

(Continued)

FOREIGN PATENT DOCUMENTS

JP    2014-071655 A    4/2014

*Primary Examiner* — Reza Aghevli
(74) *Attorney, Agent, or Firm* — Sughrue Mion, PLLC

(57) ABSTRACT

A remote operation system includes: a remote operation apparatus; and a vehicle, which is an operation target of the remote operation apparatus, wherein both of the remote operation apparatus and the vehicle are capable of communicate with each other. The remote operation apparatus is provided with: an imager configured to successively photograph an operator of the remote operation apparatus; a generator configured to generate operator information, which is information about the operator and which includes images of the operator outputted from the imager; and a controller configured to generate control information, which is information for remotely operating the vehicle, and to transmit the control information and the operator information to the vehicle. The vehicle is provided with: a vehicle controller configured to control the vehicle on the basis of the transmitted control information; and a displayer configured to display images based on the transmitted operator information.

18 Claims, 9 Drawing Sheets

(56) References Cited

U.S. PATENT DOCUMENTS

| | | | |
|---|---|---|---|
| 2016/0152336 A1* | 6/2016 | Lampazzi | B64C 39/024 |
| | | | 701/36 |
| 2018/0040140 A1* | 2/2018 | Rozenberg | G06T 7/73 |
| 2018/0107213 A1* | 4/2018 | Kuhara | H04N 7/185 |
| 2018/0137596 A1* | 5/2018 | Chenu | B61L 15/0027 |

* cited by examiner

REMOTE OPERATION SYSTEM, VEHICLE, AND REMOTE OPERATION APPARATUS

CROSS-REFERENCE TO RELATED APPLICATIONS

This application is based upon and claims the benefit of priority of the prior Japanese Patent Application No. 2016-042382, filed on Mar. 4, 2016, the entire contents of which are incorporated herein by reference.

BACKGROUND OF THE INVENTION

1. Field of the Invention

Embodiments of the present invention relate to a remote operation system associated with a vehicle, such as, for example, an automobile, a remotely operable vehicle, and a remote operation apparatus configured to remotely operate the vehicle.

2. Description of the Related Art

In this type of system, images of surroundings of a remotely operated vehicle are displayed on a remote operation apparatus (refer to Japanese Patent Application Laid Open No. 2014-071655).

By the way, users of transportation, such as, for example, buses and taxis, can comfortably use the transportation particularly because they trust a crew. In other words, the users supposedly feel secure because a reliable and trustworthy crew rides together.

On the other hand, in a remotely operated vehicle, there is no crew in many cases. In the case of a railroad vehicle, a track is clear and operation is relatively simple. It is thus considered that the users hardly feel insecure even if there is no crew.

In the case of a vehicle that runs on a road, such as an automobile, however, there are relatively many course options. There are also many situations in which relatively complicated judgment and operation are required, such as lane change, another vehicle cutting in on a course of a self-vehicle, and another vehicle passing by. In addition, if the vehicle runs on a general road, there is required vehicle operation that takes into account, for example, the presence of parked vehicles, actions of pedestrians and bicycles, and the like. If there is no crew in the vehicle that runs in such complicated situations, it is considered that the user(s) highly likely feels insecure, for example, wondering whether the vehicle is appropriately operated.

The technology described in the aforementioned patent literature is an image processing technology associated with images displayed on the remote operation apparatus. Therefore, the technology described in the aforementioned patent literature cannot give a sense of security to the user of the vehicle (i.e. an occupant), or cannot reduce a sense of insecurity, which is technically problematic.

SUMMARY

In view of the aforementioned problems, it is therefore an object of embodiments of the present invention to provide a remote operation system, a vehicle, and a remote operation apparatus, which are configured to suppress the sense of insecurity of the occupant of the remotely operated vehicle.

(Remote Operation System)

The above object of embodiments of the present invention can be achieved by a remote operation system including: a remote operation apparatus; and a vehicle, which is an operation target of the remote operation apparatus, wherein both of the remote operation apparatus and the vehicle are capable of communicate with each other, the remote operation apparatus is provided with: an imager configured to successively photograph an operator of the remote operation apparatus; a generator configured to generate operator information, which is information about the operator and which includes images of the operator outputted from the imager; and a controller configured to generate control information, which is information for remotely operating the vehicle, and to transmit the control information and the operator information to the vehicle, and the vehicle is provided with: a vehicle controller configured to control the vehicle on the basis of the transmitted control information; and a displayer configured to display images based on the transmitted operator information.

According to the remote operation system in embodiments of the present invention, the displayer of the vehicle is configured to display the images based on the operator information transmitted from the remote operation apparatus. Therefore, the images based on the operator information (i.e. the images of the operator) are displayed to the operator of the remotely operated vehicle.

From the viewpoint of the occupant of the vehicle, a state of the operator who remotely operates the vehicle can be visually confirmed. Thus, the occupant expectedly feels more secure than when the state of the operator is unclear, even though the operator (or driver) does not ride together in the vehicle. Therefore, according to the remote operation system in embodiments of the present invention, at least the sense of insecurity of the operator of the remotely operated vehicle can be suppressed. On the other hand, from the viewpoint of the operator of the remote operation apparatus, the operator can see himself or herself. Thus, the operator expectedly has a moderate tense feeling but concentrates and operates the remote operation apparatus.

In one aspect of the remote operation system according to embodiments of the present invention, wherein the vehicle further comprises a requester configured to request the remote operation apparatus to transmit the operator information, on condition that an index indicating a state of the vehicle satisfies a first predetermined condition.

In another aspect of the remote operation system according to embodiments of the present invention, wherein the controller transmits the operator information to the vehicle, on condition that a predetermined time elapses after the operator information is previously transmitted.

Alternatively, in another aspect of the remote operation system according to embodiments of the present invention, wherein the controller transmits the operator information to the vehicle, on condition that a predetermined time elapses after the operator information is previously transmitted, or on condition that an obtained index indicating a state of the vehicle satisfies a second predetermined condition.

In another aspect of the remote operation system according to embodiments of the present invention, wherein the index indicating the state of the vehicle is at least one of acceleration, deceleration, a yaw rate, a stop time, a time to collision, an extent of wandering of the vehicle, and an extent of an obstacle surrounding the vehicle.

According to these aspects, the operator information is transmitted to the vehicle if the predetermined condition is satisfied, or if the predetermined time elapses after the operator information is previously transmitted. In other words, the operator information is not transmitted to the vehicle if the predetermined condition is not satisfied and if the predetermined time does not elapse after the operator information is previously transmitted. In other words, according to those aspects, transmission frequency of the operator information is suppressed.

Here, the operator information has a relatively large data amount because it includes the images of the operator. Thus, if the transmission frequency of the relatively large amount of operator information is suppressed, it is possible to realize a reduction in a processing load of the vehicle, and suppression of communication traffic between the remote operation apparatus and the vehicle. If the communication traffic is suppressed, it is possible to ensure stability of communication between the remote operation apparatus and the vehicle. Therefore, according to those aspects, stability and safety of the remote operation system can be improved.

The "first predetermined condition" and the "second predetermined condition" according to embodiments of the present invention are set as conditions in which the occupant supposedly feels discomfort and insecure due to a behavior of the vehicle or the like, such as, for example, a condition that acceleration of the vehicle is greater than or equal to a predetermined value. By virtue of the setting as described above, if the occupant supposedly feels discomfort and insecure, new operator information is transmitted, and the images based on the operator information in the vehicle are updated. Thus, the occupant can visually confirm the state of the operator of the present time or the relatively near past.

The "first predetermined condition" and the "second predetermined condition" according to embodiments of the present invention may be set as conditions in which the occupant does not feel insecure, such as, for example, a condition that there are few obstacles surrounding the vehicle. From the viewpoint of keeping the operator's tense feeling, the operator information is desirably transmitted, regardless of whether or not the occupant feels insecure. The first predetermined condition may be the same as the second predetermined condition.

The "predetermined time" according to embodiments of the present invention may be set as a time short enough for the occupant of the vehicle not to feel discomfort, on the basis of update frequency of the images based on the operator information, such as, for example, several seconds. This is because the occupant likely suspects a failure of the apparatus if the update frequency of the images based on the operator information is too low, even though it is considered that the occupant does not keep staring at the images based on the operator information.

In another aspect of the remote operation system according to embodiments of the present invention, wherein the index indicating the state of the vehicle is at least one of acceleration, deceleration, a yaw rate, a stop time, a time to collision, an extent of wandering of the vehicle, and an extent of an obstacle surrounding the vehicle.

According to this aspect, the occupant of the vehicle can visually confirm the images based on the operator information, i.e. the state of the operator, in an arbitrary timing.

In another aspect of the remote operation system according to embodiments of the present invention, wherein the displayer includes a display apparatus and a display controller configured to control the display apparatus, and the display controller is configured separately from the vehicle controller.

According to this aspect, the display controller configured to process the operator information is provided separately from (i.e as a different device from) the vehicle controller configured to control the vehicle on the basis of the control information transmitted from the remote operation apparatus. It is thus possible reduce the processing load of the vehicle controller.

Alternatively, in another aspect of the remote operation system according to embodiments of the present invention, wherein the displayer includes a display apparatus and a display controller configured to control the display apparatus, and the display controller is configured integrally with the vehicle controller.

According to this aspect, it is possible to reduce the number of component parts, to remove wiring between the vehicle controller and the display controller, and to improve the degree of freedom in physical arrangement of the vehicle controller or the like.

(Vehicle)

The above object of embodiments of the present invention can be achieved by a vehicle, which is an operation target of an external remote operation apparatus, is provided with: a vehicle controller configured to obtain control information, which is information for remotely operating the vehicle, from the remote operation apparatus and to control the vehicle on the basis of the control information; and a displayer configured to obtain operator information, which is information about an operator of the remote operation apparatus and which includes images of the operator, from the remote operation apparatus and to display images based on the operator information.

According to the vehicle in embodiments of the present invention, the displayer is configured to display the images based on the operator information obtained from the remote operation apparatus. Therefore, the images based on the operator information (i.e. the images of the operator) are displayed to the operator of the remotely operated vehicle.

Thus, as in the remote operation system according to embodiments of the present invention, the vehicle according to embodiments of the present invention can suppress the sense of insecurity of the operator of the remotely operated vehicle. The vehicle according to embodiments of the present invention can adopt the same various aspects as those of the remote operation system according to embodiments of the present invention.

(Remote Operation Apparatus)

The above object of embodiments of the present invention can be achieved by a remote operation apparatus configured to remotely operate a vehicle, the remote operation apparatus is provided with: an imager configured to successively photograph an operator of the remote operation apparatus; a generator configured to generate operator information, which is information about the operator and which includes images of the operator outputted from the imager; and a controller configured to generate control information, which is information for remotely operating the vehicle, and to transmit the control information and the operator information to the vehicle.

According to the remote operation apparatus in embodiments of the present invention, the operator information including the images of the operator of the remote operation apparatus is transmitted to the vehicle, which is a remote operation target. In the vehicle, if the images based on the transmitted operator information are displayed, the images of the operator are displayed to the occupant of the vehicle.

Therefore, as in the remote operation system according to embodiments of the present invention, the remote operation apparatus according to embodiments of the present invention can suppress the sense of insecurity of the operator of the remotely operated vehicle. The remote operation apparatus according to embodiments of the present invention can adopt the same various aspects as those of the remote operation system according to embodiments of the present invention.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A remote operation system according to embodiments of the present invention will be explained with reference to the drawings. In the embodiments below, illustration and explanations are omitted regarding a configuration deviated from the nature or essence of embodiments of the present invention First Embodiment A remote operation system according to a first embodiment of the present invention will be explained with reference to FIG. 1 to FIG. 6. In the remote operation system according to the first embodiment, images of an operator who remotely operates a vehicle are displayed to an occupant of the vehicle. Hereinafter, a configuration and an operation outline of the remote operation system will be firstly explained. Then, operations of the vehicle and a remote operation apparatus, which constitute the remote operation system, will be explained in detail.

In the first embodiment, as an example, it is assumed that a vehicle parked in a safe place, such as a parking lot, runs to a destination desired by the occupant of the vehicle by remote operation. In the vehicle, a person who can drive the vehicle may or may not ride together.

(Configuration of Remote Operation System>

Figure 1:
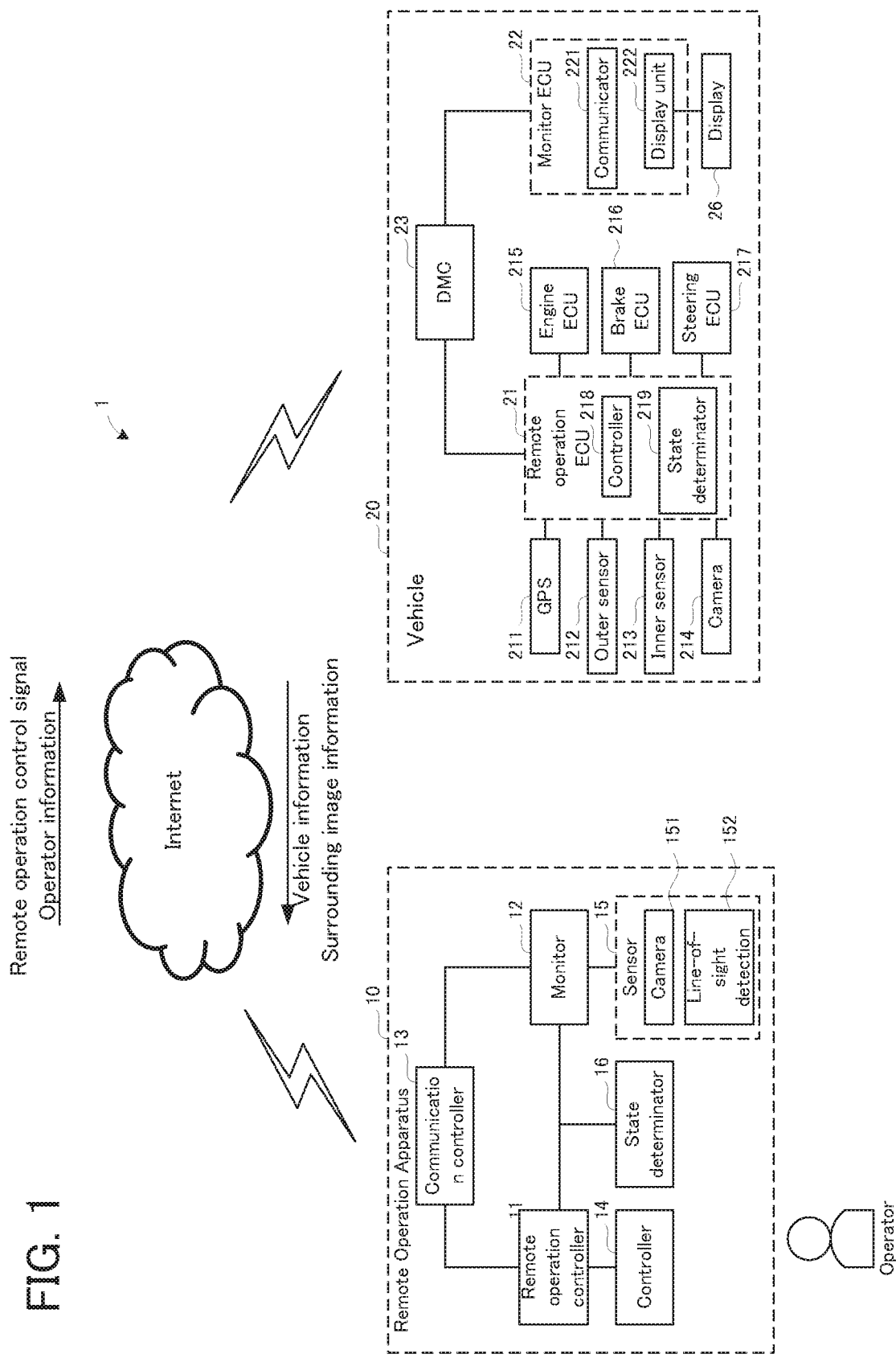
FIG. 1 is a block diagram illustrating a configuration of a remote operation system according to a first embodiment.

The configuration of the remote operation system according to the first embodiment will be explained with reference to FIG. 1. FIG. 1 is a block diagram illustrating the configuration of the remote operation system according to the first embodiment.

In FIG. 1, a remote operation system 1 is provided with a remote operation apparatus 10 and a vehicle 20. The remote operation apparatus 10 and the vehicle 20 are configured to communicate with each other through a network, such as, for example, the Internet.

1. Configuration of Remote Operation Apparatus

The remote operation apparatus 10 is placed in a not-illustrated operation room, and is operated by an operator. The remote operation apparatus 10 is provided with a remote operation controller 11, a monitor 12, a communication controller 13, a controller 14, a sensor 15, and a state determinator 16.

The controller 14 includes, for example, a simulation steering wheel, a simulation accelerator pedal, a simulation brake pedal, a display on which an image indicating surroundings of the vehicle 20, which is an operation target, and a state of the vehicle 20 are displayed, a speaker, a microphone, and the like.

The remote operation controller 11 is configured to generate a remote operation control signal for the vehicle 20, in accordance with an operation of the operator, which is inputted via the controller 14. The remote operation controller 11 is configured to transmit the remote operation control signal to the vehicle 20 via the communication controller 13. An explanation of the details of the remote operation control signal will be omitted because the existing technology/technique can be applied thereto.

The remote operation controller 11 is configured, for example, to update the image displayed on the display included in the controller 14, or to perform similar actions, on the basis of vehicle information indicating the state of the vehicle 20 obtained via the communication controller 13, and surrounding image information associated with the surroundings of the vehicle 20.

The sensor 15 is configured to detect a state of the operator. The sensor 15 particularly has a camera 151 configured to keep photographing the operator, and a line-of-sight detection sensor 152 configured to detect a line of sight of the operator. The sensor 15 may include various sensors configured, for example, to detect body temperature, pulse, blood pressure, sweating, or the like of the operator.

Here, the camera 15 may be mounted in any manner, as long as it can photograph the operator; however, it may be desirably mounted, for example, to clearly photograph expression of the operator, or to photograph the upper third of the body of the operator.

The monitor 12 is configured to monitor the state of the operator on the basis of output from the sensor 15 (specifically, for example, on the basis of an operation posture and a face direction of the operator based on image information outputted from the camera 151, line-of-sight information outputted from the line-of-sight detection sensor 152, and the like). The monitor 12 may detect the operator's concentration level and sleepiness level, as a part of the state monitoring of the operator. In this case, the remote operation controller 11 may control the controller 14 to make a sound to call attention, on condition that the operator's tendency to lose the focus or to feel sleepy is detected.

Particularly in the first embodiment, the monitor 12 is configured to generate operator information on the basis of the image information outputted from the camera 151 (i.e. image information associated with the images of the operator) or the like. The operator information may include not only the image information associated with the images of the operator, but also character information, which can specify the operator, such as, for example, the operator's name, age, affiliation, and employee number. The monitor 12 is configured to transmit the operator information to the vehicle 20 via the communication controller 13.

Here, the image information included in the operator information is not limited to image information associated with a whole image photographed by the camera 151, but may be image information associated with an image corresponding only to a part of the whole image (e.g. an image obtained by extracting an area including the operator's head, etc.).

The communication controller 13 is configured to obtain the vehicle information indicating the state of the vehicle 20 and the surrounding image information through the Internet, and is configured to output the obtained vehicle information and the obtained surrounding image information to the remote operation controller 11.

2. Configuration of Vehicle

The vehicle 20 is provided with a remote operation electronic control unit (ECU) 21, a monitor ECU 22, and a data communication module (DMC) 23.

The remote operation ECU 21 is provided with a controller 218 and a state determinator 219. Output signals from a global positioning system (GPS) 211, an outer sensor 212, an inner sensor 213, and a camera 214 are inputted to the remote operation ECU 21.

The outer sensor 212 includes, for example, a radar sensor, an ultrasonic sensor, a light detection and ranging (LIDAR), or the like. The inner sensor 213 includes, for example, a vehicle speed sensor, an acceleration sensor, a yaw rate sensor, a rudder angle sensor, a steering angle sensor, a number-of-engine revolutions sensor, a temperature sensor, or the like.

The controller 218 of the remote operation ECU 21 is configured to control an engine ECU 215, a brake ECU 216, and a steering ECU 217, on the basis of the remote operation control signal obtained via the DMC 23 and output signals from the GPS 211, the outer sensor 212, the inner sensor 213, and the camera 214. Since the controller 218 is configured in this manner, the remote operation apparatus 10 can remotely operate the vehicle 20.

The engine ECU 215 is one example of an apparatus configured to control a drive mechanism of the vehicle 20. The engine ECU 215 may not only control a not-illustrated engine as a drive source of the vehicle, but also may control, for example, a transmission or the like. If the vehicle 20 is a hybrid vehicle, the engine ECU 215 also controls a motor as the drive source, in addition to the engine. If the vehicle 20 is an electric vehicle, the engine ECU 215 also controls the motor as the drive source, instead of the engine.

The brake ECU 216 is one example of an apparatus configured to control a brake mechanism of the vehicle 20. The steering ECU 217 is one example of an apparatus configured to control a steering mechanism of the vehicle 20.

The remote operation ECU 21 is configured to generate the vehicle information indicating the state of the vehicle 20, on the basis of the output signals from the GPS 211, the outer sensor 212, and the inner sensor 213. The remote operation ECU 21 is further configured to generate the surrounding image information on the basis of image information outputted from the camera 214 (i.e. image information associated with images of the surroundings of the vehicle 20) and the output signal from the outer sensor 212.

The remote operation ECU 21 is configured to transmit the vehicle information and the surrounding image information to the remote operation apparatus 10 via the DMC 23. An explanation of the details of the vehicle information and the surrounding image information will be omitted because the existing technology/technique can be applied thereto.

The monitor ECU 22 is provided with a communicator 221 configured to communicate with the DMC 23, and a display unit 222 configured to control a display 26. The display unit 222 is configured to control the display 26 to display images based on the operator information obtained via the DMC 23 and the communicator 221 (i.e. images of the operator).

If the operator information includes character information, the display unit 222 may control the display 26 to display characters indicating, for example, the operator's name or the like, in addition to the images of the operator.

The DMC 23 is configured to obtain the remote operation control signal and the operator information through the Internet, and is configured to output the obtained remote operation control signal to the remote operation ECU 21 and to output the obtained operator information to the monitor ECU 22.

In FIG. 1, the Internet is mentioned as one example of the network; however, the type of the network may be determined depending on a running range of the vehicle 20. For example, if the vehicle 20 runs by remote operation only in a site of a commercial facility or in a site of an office, a local area network (LAN) may be used instead of the Internet.

(Operation Outline of Remote Operation System)

Figure 2:
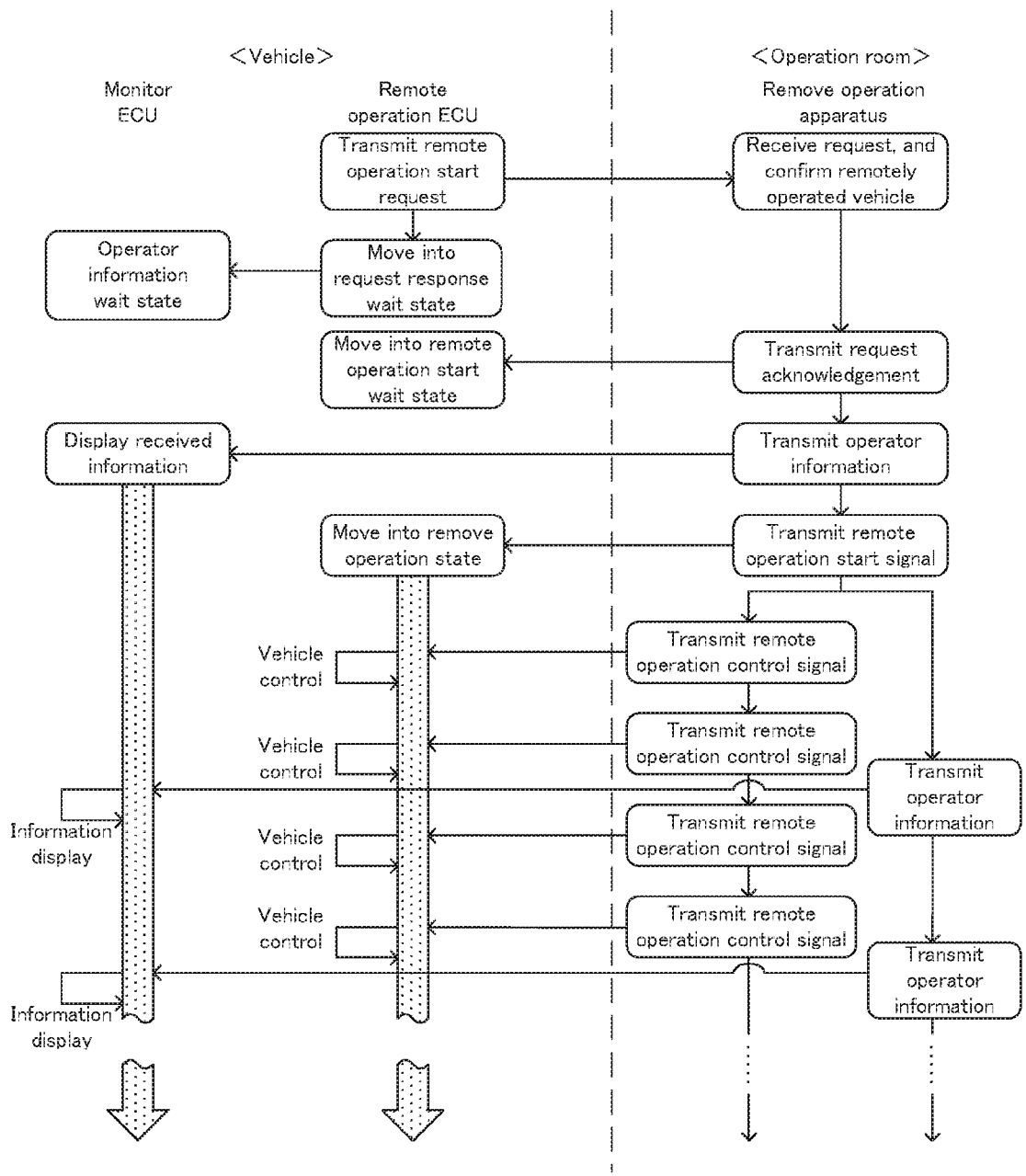
FIG. 2 is a time chart illustrating an outline of operations of the remote operation system according to the first embodiment.

Next, an operation outline of the remote operation system 1 will be explained with reference to FIG. 2 in addition to FIG. 1. FIG. 2 is a time chart illustrating the outline of operations of the remote operation system according to the first embodiment.

The occupant (i.e. user) of the vehicle 20 who desires the remote operation firstly inputs the destination or the like via a not-illustrated human machine interface (HMI), which is installed in the vehicle 20, and inputs a request for the remote operation. As a result, the remote operation ECU 21 transmits a remote operation start request to the remote operation apparatus 10 via the DMC 23.

Then, the remote operation ECU 21 moves into a request response wait state and transmits a signal indicating the transition into the request response wait state, to the monitor ECU 22 via the DMC 23. As a result, the monitor ECU 22 moves into an operator information wait state.

Here, the "request response wait state" means a state of waiting for a response to the remote operation state request from the remote operation apparatus 10. The "operator information wait state" means a state of waiting for the operator information from the remote operation apparatus 10.

The remote operation controller 11 of the remote operation apparatus 10 that has received the remote operation start request performs a predetermined authentication process or the like, and confirms the vehicle 20, which is the operation target. An explanation of the details of the confirmation of the vehicle including the predetermined authentication process will be omitted because the existing technology/technique can be applied thereto.

After completing the confirmation of the vehicle 20, the remote operation controller 11 transmits a request acknowledgement (ACK) to the vehicle 20 via the communication controller 13.

The DMC 23 of the vehicle 20 that has received the request acknowledgement outputs the request acknowledgment to the remote operation ECU 21. As a result, the remote operation ECU 21 moves into a remote operation start wait state. Here, the "remote operation start wait state" means a state of waiting for a remote operation start signal (i.e. a signal that triggers the remote operation) from the remote operation apparatus 10.

After transmitting the request acknowledgement, the remote operation controller 11 of the remote operation apparatus 10 controls the monitor 12 to transmit the operator information to the vehicle 20. The DMC 23 of the vehicle 20 that has received the operator information outputs the operator information to the monitor ECU 22. As a result, the display unit 222 of the monitor ECU 22 controls the display 26 to display the images based on the operator information. As a result, the images of the operator are displayed to the occupant of the vehicle 20.

In parallel with the transmission of the operator information, the remote operation controller 11 of the remote operation apparatus 10 transmits the remote operation start signal to the vehicle 20 via the communication controller 13. The DMC 23 of the vehicle 20 that has received the remote operation start signal outputs the remote operation start signal to the remote operation ECU 21. As a result, the remote operation ECU 21 moves into a remote operation state. The "remote operation state" means a state of controlling the engine ECU 215 or the like, on the basis of the remote operation control signal from the remote operation apparatus 10, or the like.

After transmitting the remote operation start signal, the remote operation controller 11 of the remote operation apparatus 10 periodically transmits the remote operation control signal to the vehicle 20 via the communication controller 13. The remote operation controller 11 further controls the monitor 12 to transmit the operator information to the vehicle 20 at lower frequency than frequency of the transmission of the remote operation control signal.

As a result, in the vehicle 20, the control of the engine ECU 215 or the like based on the remote operation control signal is continued by the controller 218 of the remote operation ECU 21, and the images based on the operator information displayed on the display 26 are sequentially updated by the display unit 222 of the monitor ECU 22.

(State Transition of Vehicle)

Figure 3:
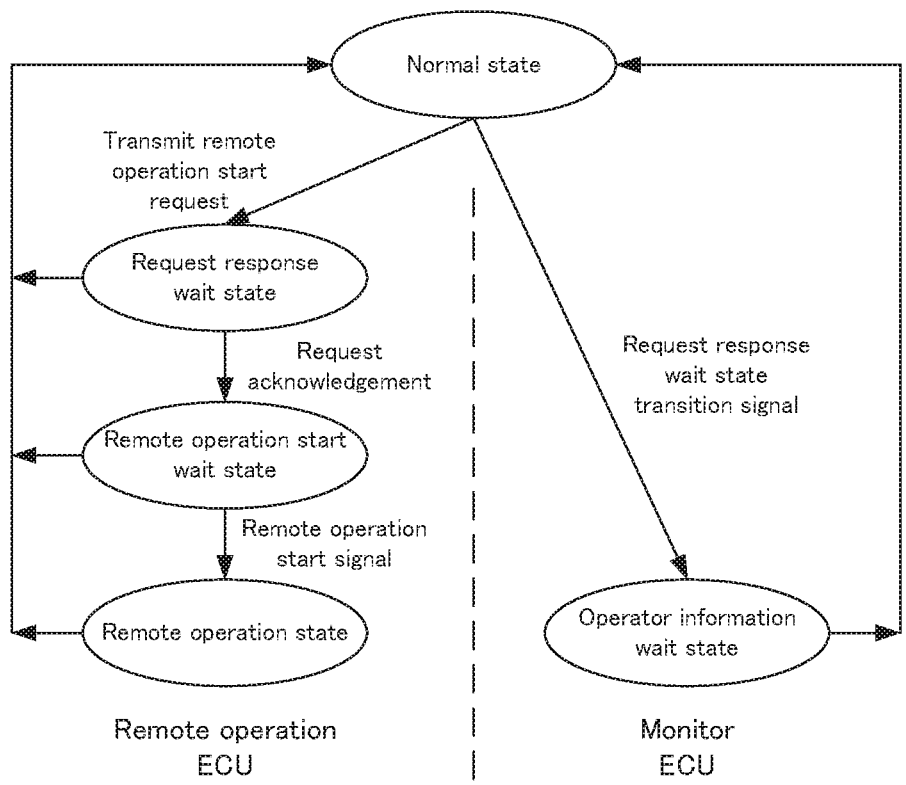
FIG. 3 is a diagram illustrating state transition of a vehicle according to the first embodiment.

Next, state transition of each of the remote operation ECU 21 and the monitor ECU 21 of the vehicle 20 will be explained with reference to FIG. 3 in addition to FIG. 1 and FIG. 2. FIG. 3 is a diagram illustrating the state transition of the vehicle according to the first embodiment. In FIG. 3, a "normal state" means a state in which the vehicle 20 can run in accordance with an operation of a driver who rides in the vehicle 20 (i.e. a state in which the vehicle 20 is not remotely operated).

If the vehicle 20 is in the normal state, the remote operation ECU 21 moves into the request response wait state from the normal state, which is triggered by the transmission of the remote operation start request to the remote operation apparatus 10. At this time, the remote operation ECU 21 transmits a request response wait state transition signal indicating the transition into the request response wait state, to the monitor ECU 22 via the DMC 23. As a result, the monitor ECU 22 moves into the operator information wait state from the normal state.

The remote operation ECU 21 that has moved into the request response wait state moves into the remote operation start wait state, if the remote operation ECU 21 receives the request acknowledgement from the remote operation apparatus 10. On the other hand, the remote operation ECU 21 moves into the normal state, if the remote operation ECU 21 does not receive the request acknowledgement even when a certain time elapses after the transmission of the remote operation start request, or if the remote operation ECU 21 receives a negative acknowledgement (NACK) from the remote operation apparatus 10. At this time, the remote operation ECU 21 transmits a normal state transition signal indicating the transition into the normal state, to the monitor ECU 22 via the DMC 23.

The remote operation ECU 21 that has moved into the remote operation start wait state moves into the remote operation state, if the remote operation ECU 21 receives the remote operation start signal from the remote operation apparatus 10. On the other hand, the remote operation ECU 21 moves into the normal state, if the remote operation ECU 21 does not receive the remote operation start signal even when a certain time elapses after the transition into the remote operation start wait state, or if the remote operation ECU 21 receives the negative acknowledgement from the remote operation apparatus 10. At this time, the remote operation ECU 21 transmits the normal state transition signal to the monitor ECU 22 via the DMC 23.

The remote operation ECU 21 that has moved into the remote operation state moves into the normal state, in principle, if the remote operation ECU 21 receives a remote operation end signal indicating an end of the remote operation, from the remote operation apparatus 10. At this time, the remote operation ECU 21 transmits the normal state transition signal to the monitor ECU 22 via the DMC 23. However, the remote operation ECU 21 in the remote operation state exceptionally moves into the normal state, if the remote operation ECU 21 does not receive the remote operation control signal for a certain time. Here, a start point of the certain time is a time point of the receipt of the remote operation start signal, or a time point of the previous receipt of the remote operation signal.

The monitor ECU 22 that has moved into the operator information wait state moves into the normal state, if the monitor ECU 22 receives the normal state transition signal from the remote operation ECU 21, or if the monitor ECU 22 receives the remote operation end signal from the remote operation apparatus 10. The expression "if . . . receives the normal state transition signal" conceptually includes not only a time point of the receipt of the normal state transition signal, but also a period after the time point of the receipt of the normal state transition signal. In the same manner, the expression "if . . . receives the remote operation end signal" conceptually includes not only a time point of the receipt of the remote operation end signal, but also a period after the time point of the receipt of the remote operation end signal.

(Operations of Monitor ECU of Vehicle)

Next, operations of the monitor ECU 22 that has moved into the operator information wait state will be specifically explained with reference to a flowchart in FIG. 4 in addition to FIG. 1. A process illustrated by the flowchart in FIG. 4 is started when the monitor ECU 22 moves into the operator information wait state from the normal state.

Figure 4:
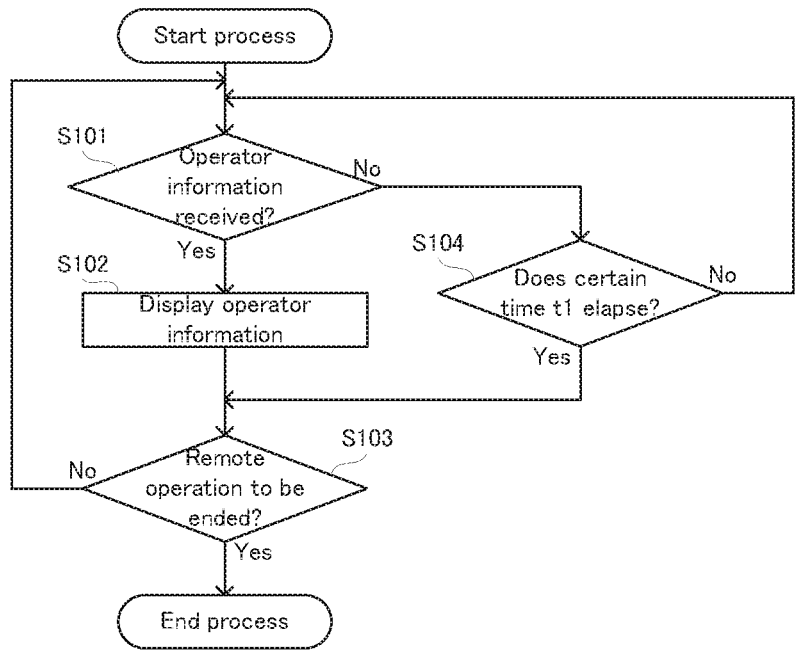
FIG. 4 is a flowchart illustrating operations of a monitor ECU of the vehicle according to the first embodiment.

In FIG. 4, the monitor ECU 22 determines whether or not the operator information is newly received (step S101). In the determination, if it is determined that the operator information is newly received (the step S101: Yes), the display unit 22 of the monitor ECU 22 controls the display 26 to display images based on the new operator information (step S102).

Then, the monitor ECU 22 determines whether or not the remote operation is to be ended (step S103). Specifically, the monitor ECU 22 determines whether or not the normal state transition signal is received from the remote operation ECU 21, and whether or not the remote operation end signal is received from the remote operation apparatus 10.

In the determination in the step S103, if it is determined that the remote operation is to be ended (i.e. if it is determined that the normal state transition signal is received, and/or if it is determined that the remote operation end signal is received) (the step S103: Yes), the monitor ECU 22 ends the process and moves into the normal state.

On the other hand, in the determination in the step S103, if it is determined that the remote operation is not to be ended (i.e. if it is determined that the normal state transition signal is not received, and if it is determined that the remote operation end signal is not received) (the step S103: No), the monitor ECU 22 performs the process of the step S101 again when a predetermined time elapses.

In the determination in the step S101, if it is determined that the operator information is not newly received (the step S101: No), the monitor ECU 22 determines whether or not a certain time t1 elapses after the previous receipt of the operator information (step S104). In the determination, if it is determined that the certain time t1 does not elapse after the previous receipt of the operator information (the step S104: No), the monitor ECU 22 performs the process of the step S101 again when a predetermined time elapses.

On the other hand, in the determination in the step S104, if it is determined that the certain time t1 elapses after the previous receipt of the operator information (the step S104: Yes), the monitor ECU 22 performs the process of the step S103.

The monitor ECU 22 may determine "whether or not a remote operation flag set by the remote operation ECU 21 is OFF", as a specific example of the determination of "whether or not the remote operation is to be ended". The "remote operation flag" is turned ON when the remote operation ECU 21 moves into the remote operation state, and is turned OFF when the remote operation ECU 21 moves into the normal state from the remote operation state, as described later. Thus, the expression "the remote operation flag is OFF" means that the remote operation is to be ended.

(Operations of Remote Operation ECU)

Next, operations of the remote operation ECU 21 will be specifically explained with reference to a flowchart in FIG. 5 in addition to FIG. 1.

Figure 5:
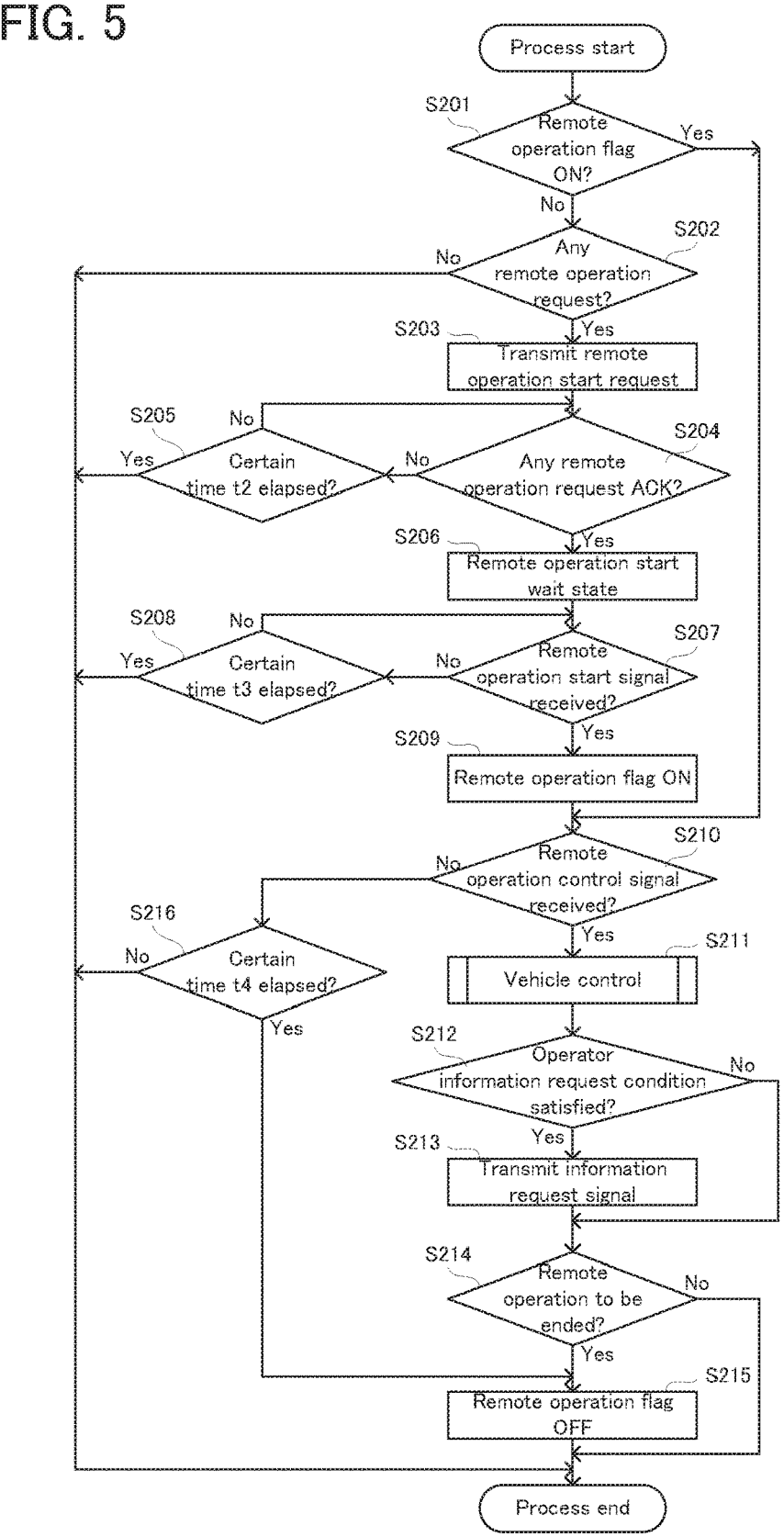
FIG. 5 is a flowchart illustrating operations of a remote operation ECU of the vehicle according to the first embodiment.

In FIG. 5, the controller 218 of the remote operation ECU 21 determines whether or not the remote operation flag is ON (step S201). In the determination, if it is determined that the remote operation flag is ON (the step S201: Yes), a process of a step S201 described later is performed. An initial value of the "remote operation flag" is OFF.

On the other hand, in the determination in the step S201, if it is determined that the remote operation flag is not ON (i.e. the remote operation flag is OFF) (the step S201: No), the controller 218 determines whether or not there is a remote operation request from the occupant of the vehicle 20 (step S202).

In the determination in the step S202, if it is determined that there is no remote operation request (the step S202: No), the controller 218 ends the process and performs the process of the step S201 again when a predetermined time elapses.

On the other hand, in the determination in the step S202, if it is determined that there is the remote operation request (the step S202: Yes), the controller 218 transmits the remote operation start request to the remote operation apparatus 10 via the DMC 23 (step S203). At this time, the remote operation ECU 21 moves into the request response wait state from the normal state, and transmits the request response wait state transition signal to the monitor ECU 22 via the DMC 23. As a result, the monitor ECU 22 moves into the operator information wait state.

Then, the controller 218 determines whether or not a remote operation request acknowledgement is received from the remote operation apparatus 10 (step S204). In the determination, if it is determined that the remote operation request acknowledgement is not received (the step S204: No), the controller 218 determines whether or not a certain time t2 elapses after the transmission of the remote operation start request (step S205).

In the determination in the step S205, if it is determined that the certain time t2 does not elapse (the step S205: No), the controller 218 performs the process of the step S204 again. On the other hand, if it is determined that the certain time t2 elapses (the step S205: Yes), the controller 218 ends the process due to timeout.

At this time, the remote operation ECU 21 moves into the normal state from the request response wait state, and transmits the normal state transition signal to the monitor ECU 22 via the DMC 23. As a result, the monitor ECU 22 moves into the normal state from the operator information wait state. The controller 218 performs the process of the step S201 again when a predetermined time elapses after the remote operation ECU 21 moves into the normal state.

In the determination in the step S204, if it is determined that the remote operation request acknowledgement is received (the step S204: Yes), the controller 218 moves into the remote operation start wait state from the request response wait state (step S206).

Then, the controller 218 determines whether or not the remote operation start signal is received from the remote operation apparatus 10 (step S207). In the determination, if it is determined that the remote operation start signal is not received (the step S207: No), the remote operation ECU 21 determines whether or not a certain time t3 elapses after the transition into the remote operation start wait state (step S208).

In the determination in the step S208, if it is determined that the certain time t3 does not elapse (the step S208: No), the controller 218 performs the process of the step S207 again. On the other hand, in the determination in the step S208, if it is determined that the certain time t3 elapses (the step S208: Yes), the controller 218 ends the process due to timeout.

At this time, the remote operation ECU 21 moves into the normal state from the remote operation start wait state, and transmits the normal state transition signal to the monitor ECU 22 via the DMC 23. As a result, the monitor ECU 22 moves into the normal state from the operator information wait state. The controller 218 performs the process of the step S201 again when a predetermined time elapses after the remote operation ECU 21 moves into the normal state.

In the determination in the step S207, if it is determined that the remote operation start signal is received (the step S207: Yes), the controller 218 turns ON the remote operation flag (step S209). At this time, the remote operation ECU 21 moves into the remote operation state from the remote operation start wait state.

Then, the controller 218 determines whether or not the remote operation control signal is received from the remote operation apparatus 10 (step S210). In this determination, if it is determined that the remote operation control signal is received (the step S210: Yes), the controller 218 controls each of the engine ECU 215, the brake ECU 216, and the steering ECU 217, on the basis of the received remote operation control signal and the respective output signals from the GPS 211, the outer sensor 212, the inner sensor 213, and the camera 214 (step S211).

Then, the controller 218 determines whether or not an operator information request condition is satisfied (step S212). In this determination, if it is determined that the operator information request condition is satisfied (the step S212: Yes), the controller 218 transmits an operator information request signal to the remote operation apparatus 10 via the DMC 23 (step S213).

The determination of satisfaction of the operator information request condition is performed as a different process (or a so-called sub routine) from this process as shown in FIG. 5, by the state determinator 219 of the remote operation ECU 21. The controller 218 determines whether or not the operator information request condition is satisfied, on the basis of a determination result by the state determinator 219. Specific content of the "operator information request condition" will be described later.

In the determination in the step S212, if it is determined that the operator information request condition is not satisfied (the step S212: No), or after the step S213, the controller 218 determines whether or not the remote operation is to be ended (step S214). Specifically, the controller 218 determines whether or not the remote operation end signal from the remote operation apparatus 10.

In the determination in the step S214, if it is determined that the remote operation is not to be ended (i.e. that the remote operation is continued) (the step S214: No), the controller 218 temporarily ends the process and performs the process of the step S201 again when a predetermined time elapses.

In this case, the remote operation flag remains "ON". Thus, in the determination in the step S201 performed again, it is determined that the remote operation flag is "ON" (the step S201: Yes). After that, the process of the step S210 is performed. In other words, basically, the process of the step S210 to the step S213 are repeatedly performed from when the remote operation flag turns "ON" in the process of the step S209 to when it is determined that the remote operation is to be ended in the determination in the step S214.

In the determination in the step S214, if it is determined that the remote operation is to be ended (the step S214: Yes), the controller 218 turns "OFF" the remote operation flag (step S215) and ends the process.

At this time, the remote operation ECU 21 moves into the normal state from the remote operation state, and transmits the normal state transition signal to the monitor ECU 22 via the DMC 23. As a result, the monitor ECU 22 moves into the normal state from the operator information wait state. The controller 218 performs the process of the step S201 again when a predetermined time elapses after the remote operation ECU 21 moves into the normal state.

In the determination in the step S210, if it is determined that the remote operation control signal is not received (the step S210: No), the controller 218 determines whether or not a certain time t4 elapses after the remote operation control signal or the remote operation start signal is previously received (step S216).

In the determination in the step S216, if it is determined that the certain time t4 does not elapse (the step S216: No), the controller 218 temporarily ends the process and performs the process of the step S201 again when a predetermined time elapses. In this case, the remote operation flag remains "ON". Thus, in the determination in the step S201 performed again, it is determined that the remote operation flag is "ON" (the step S201: Yes), and then, the process of the step S210 is performed.

On the other hand, in the determination in the step S216, if it is determined that the certain time t4 elapses (the step S216: Yes), the controller 218 turns "OFF" the remote operation flag (the step S215) and ends the process. In this case, the remote operation ends before the vehicle reaches the destination desired by the occupant of the vehicle 20. Thus, the controller 219 uses the existing automatic running technologies/techniques to pull over and stop the vehicle 20 in a safe place.

Even in this case, the remote operation ECU 21 moves into the normal state from the remote operation state due to the fact that the remote operation flag is turned "OFF". The expression "in the determination in the step S216, if it is determined that the certain time t4 elapses" corresponds to that "the remote operation ECU 21 in the remote operation state exceptionally moves into the normal state" in the aforementioned "State Transition of Vehicle".

The certain times t2, t3, and t4 may be appropriately set, for example, in view of a communication environment between the remote operation apparatus 10 and the vehicle 20, respective communication periods of the communication controller 13 of the remote operation apparatus 10 and the DMC 23 of the vehicle 20, and the like. The certain times t2, t3, and t4 may have the same value or may have different values.

(Operations of Remote Operation Apparatus)

Next, operations of the remote operation apparatus 10 will be specifically explained with reference to a flowchart in FIG. 6 in addition to FIG. 1. A process indicated by the flowchart in FIG. 6 is repeatedly performed with a regular or irregular period in operation of the remote operation apparatus 10.

Figure 6:
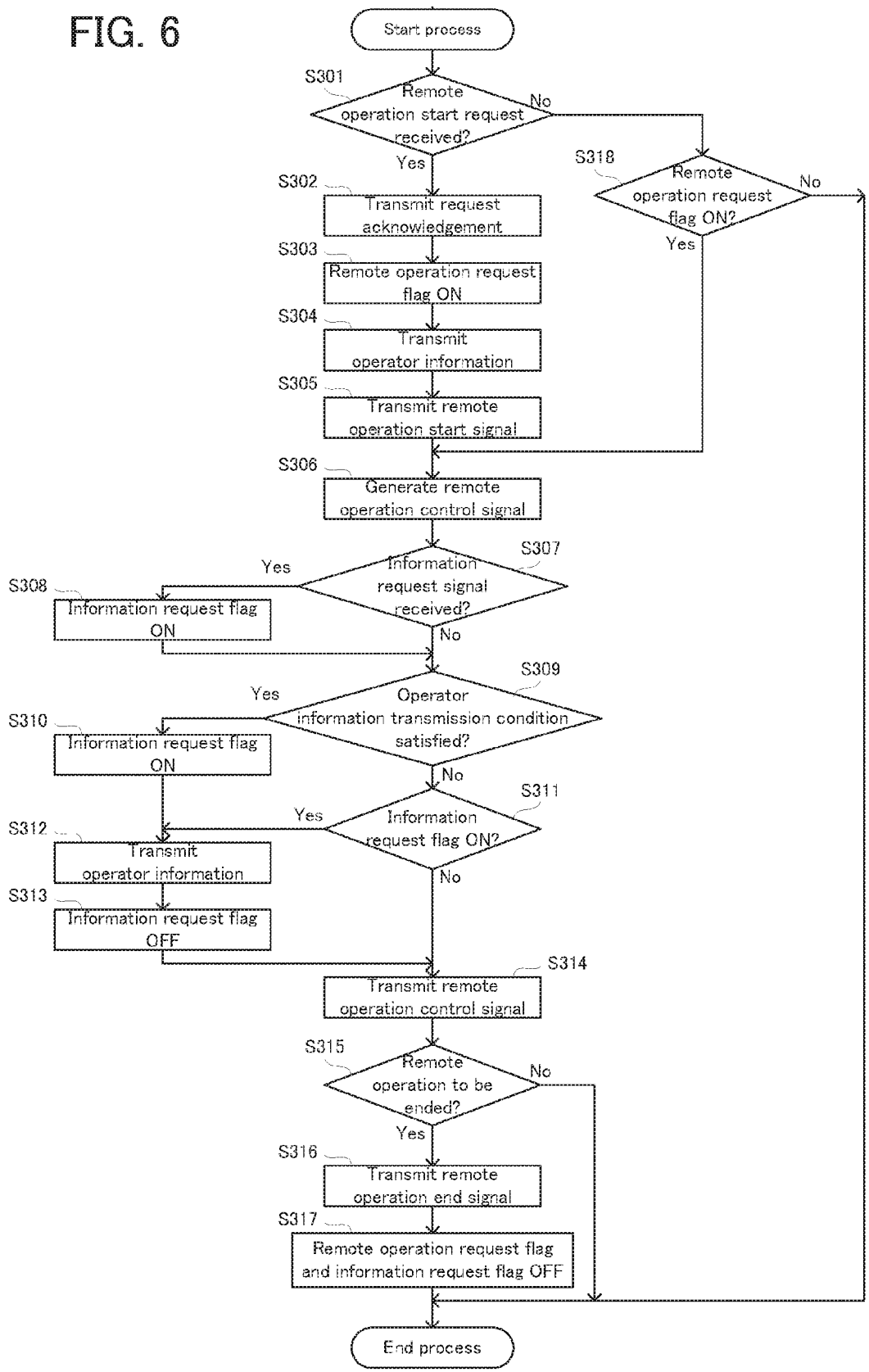
FIG. 6 is a flowchart illustrating operations of a remote operation apparatus according to the first embodiment.

In FIG. 6, the remote operation controller 11 of the remote operation apparatus 10 determines whether or not the remote operation start request is received from the vehicle 20 (step S301). In the determination, if it is determined that the remote operation start request is not received (the step S301: No), the remote operation controller 11 determines whether or not a remote operation request flag is "ON" (step S318). An initial value of the "remote operation request flag" is "OFF".

In the determination in the step S318, if it is determined that the remote operation request flag is "ON" (the step S318: Yes), the remote operation controller 11 performs a process of the step S306 described later. On the other hand, if it is determined that the remote operation request flag is not "ON" (i.e. if it is determined that the remote operation request flag is not "OFF") (the step S318: No), the remote operation controller 11 ends the process.

In the determination in the step S301, if it is determined that the remote operation start request is received (the step S301: Yes), the remote operation controller 11 transmits the request acknowledgment to the vehicle 20 via the communication controller 13 on condition that the confirmation of the vehicle 20, which is the operation target, is normally ended (step S302), and turns "ON" the remote operation request flag (step S303). As a result of the process of the step S302, the remote operation ECU 21 of the vehicle 20 moves into the remote operation start wait state (refer to the step S206 in FIG. 5).

Then, the remote operation controller 11 controls the monitor 12 to transmit the operator information to the vehicle 20 (step S304). In parallel with the process of the step S304, the remote operation controller 11 transmits the remote operation start signal to the vehicle 20 via the communication controller 13 (step S305). The remote operation controller 11 generates the remote operation control signal, which is triggered by the transmission of the remote operation start signal (step S306). As a result of the process of the step S305, the remote operation ECU 21 of the vehicle 20 moves into the remote operation state (refer to the step S209 in FIG. 5).

Then, the remote operation controller 11 determines whether or not an information request signal is received from the vehicle 20 (step S307). In the determination, if it is determined that the information request signal is received (the step S307: Yes), the remote operation controller 11 turns "ON" an information request flag step S308). An initial value of the "information request flag" is "OFF".

In the determination in the step S307, if it is determined that the information request signal is not received (the step S307: No), or after the process of the step S308, the remote operation controller 11 determines whether or not an operator information transmission condition is satisfied (step S309).

The determination of satisfaction of the operator information transmission condition is performed as a different process (or a so-called sub routine) from this process as shown in FIG. 6, by the state determinator 16. The remote operation controller 11 determines whether or not the operator information transmission condition is satisfied, on the basis of a determination result by the state determinator 16. Specific content of the "operator information transmission condition" will be described later.

In the determination in the step S309, if it is determined that the operator information transmission condition is satisfied (the step S309: Yes), the remote operation controller 11 turns "ON" the information request flag (step S310). Then, the remote operation controller 11 controls the monitor 12 to transmit the operator information to the vehicle 20 (step S312), and turns "OFF" the information request flag (step S313).

On the other hand, in the determination in the step S309, if it is determined that operator information transmission condition is not satisfied (the step S309: No), the remote operation controller 11 determines whether or not the information request flag is "ON" (step S311). In the determination, if it is determined that the information request flag is "ON" (the step S311: Yes), the remote operation controller 11 performs the process of the step S312.

In the determination in the step S311, if it is determined that the information request flag is not "ON" (i.e. if it is determined that the information request flag is "OFF") (the step S311: NO), or after the process of the step S313, the remote operation controller 11 transmits the remote operation controls signal generated in the process of the step S306, to the vehicle 20 via the communication controller 13 (step S314).

Then, the remote operation controller 11 determines whether or not the remote operation is to be ended (step S315). For example, if the vehicle 20 reaches the destination, the operator of the remote operation apparatus 10 inputs that the remote operation is to be ended, via the controller 14. The remote operation controller determines that the remote operation is to be ended, on condition that the input is performed.

In the determination in the step S315, if it is determined that the remote operation is to be ended (the step S315: Yes), the remote operation controller 11 transmits the remote operation end signal to the vehicle 20 via the communication controller 13 (step S316), turns "OFF" the remote operation request flag and the information request flag (step S317), and ends the process. As a result of the process of the step S316, the remote operation ECU 21 of the vehicle 20 moves into the normal state from the remote operation state.

On the other hand, in the determination in the step S315, if it is determined that the remote operation is not to be ended (the step S315: No), the remote operation controller 11 temporarily ends the process and performs the process of the step S301 again when a predetermined time elapses. In this case, the remote operation request flag remains "ON", and the vehicle 20 is remotely operated. Thus, in the determination in the step S301 performed again, it is determined that the remote operation start request is not received (the step S301: No), and in the determination in the step S318, it is determined that the remote operation request flag is "ON" (the step S318: Yes). After that, the process of the step S306 is performed. In other words, the process of the step S306 to the step S314 are repeatedly performed from when the remote operation start signal is transmitted in the process of the step S305 to when it is determined that the remote operation is to be ended in the determination in the step S315.

(Operator Information Request Condition, Operator Information Transmission Condition)

Next, the operator information request condition and the operator information transmission condition will be specifically explained.

1. Operator Information Request Condition

The operator information request condition according to the embodiment includes the following six conditions; namely, (i) acceleration of the vehicle 20 exceeds an acceleration threshold value, or deceleration of the vehicle 20 exceeds a deceleration threshold value;

(ii) a stop time exceeds a stop time threshold value, wherein the stop time is a time length from a time point at which a color of a traffic light closest to the vehicle 20 changes from red to blue on a course of the vehicle 20;

(iii) an extent of wandering of the vehicle exceeds an allowable range;

(iv) a time to collision (TTC) exceeds a TTC threshold value, wherein the TTC is obtained from a distance between the vehicle 20 and a vehicle running immediately ahead of the vehicle 20 (i.e. an inter-vehicle distance);

(v) a yaw rate of the vehicle 20 exceeds a yaw rate threshold value; and (vi) a value indicating an obstacle (e.g. another vehicle, a pedestrian, etc.) surrounding the vehicle 20 exceeds a surrounding obstacle threshold value.

In the determination in the step S212 described above (refer to FIG. 5), it is determined that the operator information request condition is satisfied if at least one of the six conditions is satisfied. On the other hand, it is determined that the operator information request condition is not satisfied if all the six conditions are not satisfied.

2. Operator Information Transmission Condition

The operator information transmission condition according to the embodiment is that "a certain time t5 elapses after the information request flag is turned "OFF"".

3. Regarding Respective Threshold Values and Parameters

The "acceleration threshold value" may be set as acceleration which is an upper limit value of an allowable range, for example, based on a relation between the acceleration, and a value indicating sensible acceleration and/or a value indicating vibration and noise generated with acceleration, wherein the relation may be obtained by experiments or simulations.

In the same manner, the "deceleration threshold value" may be set as deceleration which is an upper limit value of an allowable range, for example, based on a relation between the deceleration, and a value indicating sensible acceleration and/or a value indicating vibration and noise generated with deceleration, wherein the relation may be obtained by experiments or simulations.

The "stop time threshold value" may be set as an upper limit value of a stop time in which the occupant supposedly does not feel discomfort, for example, in accordance with another vehicle that exists ahead of the vehicle 20, a road situation, or the like. Information about the color of the traffic light may be obtained by performing predetermined image processing on images photographed by the camera 214 of the vehicle 20.

The "extent of wandering of the vehicle" is estimated, for example, from a speed of the vehicle 20 and an operation amount of a steering wheel (or a steering angle change range). The "allowable range" according to the extent of wandering may be set as an appropriate change range of a steering angle, which is estimated or obtained, for example, in accordance with a road shape, the course of the vehicle 20 (e.g. go straight, turn right, turn left, etc.), a vehicle speed, or the like.

The "TTC threshold value" may be set, for example, in view of a time to collision specified in Technical Guidelines from the Ordinance of the Ministry of Land, performance of a brake mechanism (e.g. a brake for reducing collision damage, etc.), a time delay caused by communication between the remote operation apparatus 10 and the vehicle 20, or the like.

The "yaw rate threshold value" may be set as a value that is greater by an allowable margin than a yaw rate generated when the vehicle runs at a speed suitable for a road curvature, for example, based on a relation among the speed, the road curvature, and the yaw rate, wherein the relation may be obtained by experiments or simulations.

The "value indicating the obstacle" surrounding the vehicle 20 is obtained, for example, by scoring each object on the basis of a distance to the object from the vehicle 20, an object position (ahead, behind, side, etc.), a relative speed of the object, a relative moving direction of the object, or the like, and by adding the score of the object that can be the obstacle of the vehicle 20.

The "surrounding obstacle threshold value" may be set as a value that is less by a predetermined value than a value indicating an obstacle that starts to influence the operation of the vehicle 20, for example, based on a relation between the extent of the influence on the operation of the vehicle 20 and values indicating obstacles, which are obtained by variously changing objects surrounding the vehicle 20, wherein the relation may be obtained by experiments, experiences, or simulations.

4. Setting Concept for Conditions

The operator information request condition and the operator information transmission condition according to the embodiment have different setting concepts.

As explained in the aforementioned "Operations of Remote Operation Apparatus", the processes of the step S306 to the step S314 are repeatedly performed from when the remote operation start signal is transmitted in the process of the step S305 to when it is determined that the remote operation is to be ended in the determination in the step S315.

Here, in particular, please note that if it is determined that the information request signal is not received in the determination in the step S307 (the step S307: No), in other words, if the information request flag is "OFF", the operator information is not transmitted to the vehicle 20 unless it is determined that the operator information transmission condition is satisfied in the determination in the step S309.

This is for the following reasons. If the state of the vehicle 20 or the like does not satisfy the operator information request condition, it is considered that the vehicle 20 is appropriately remotely controlled. In this case, it is presumed that the occupant of the vehicle 20 unlikely feels anxiety. In other words, it is presumed that the occupant of the vehicle 20 unlikely pays attention to the images based on the operator information (i.e. the state of the operator).

However, even if the vehicle 20 is appropriately remotely operated, specification in which the images based on the operator information are not updated is not preferable in terms of enhancing a sense of security to be given to the occupant of the vehicle 20.

Thus, in the embodiment, the operator information transmission condition is set in such a manner that "the certain time t5 elapses after the information request flag is turned "OFF"". Therefore, when the certain time t5 elapses after the information request flag is turned "OFF", it is determined that the operator information transmission condition is satisfied in the determination in the step S309 (the step S309: Yes), and the operator information is transmitted to the vehicle 20. As a result, in the vehicle 20, the images based on the operator information are updated at least every certain time t5. In the process of the step S310, a counter configured to measure the certain time t5 is reset once the information request flag is turned "ON".

The "certain time t5" is, for example, several seconds. This is because the occupant of the vehicle 20 supposedly does not keep staring at the images based on the operator information if the vehicle 20 is appropriately remotely operated. In other words, it is because the occupant of the vehicle 20 supposedly does not pay attention to the images based on the operator information, close enough to require smooth video display, if the vehicle 20 is appropriately remotely operated.

On the other hand, the operator information request condition is associated with a behavior of the vehicle 20 or the like related to the occupant's subjective sense of discomfort and sense of insecurity.

(Technical Effects)

According to the remote operation system 1, while the vehicle 20 is remotely operated by the remote operation apparatus 10, the operator information is transmitted from the remote operation apparatus 10 to the vehicle 20. The display unit 222 of the monitor ECU 22 of the vehicle 20 controls the display 26 to display the images based on the operator information. As a result, the images of the operator is displayed to the occupant of the vehicle 20.

From the viewpoint of the occupant of the vehicle 20, the state of the operator can be visually confirmed, and thus, the occupant expectedly feels more secure than in a case where the state of the operator is unknown. On the other hand, from the viewpoint of the operator of the remote operation apparatus 10, the operator is always photographed by the camera 151 during the remote operation, and thus, the operator expectedly has a moderate tense feeling but concentrates and operates the remote operation apparatus 10.

Particularly in the embodiment, due to the satisfaction of at least one of the operator information request condition (or the aforementioned conditions (i) to (vi)) and the operator information transmission condition, update frequency of the images of the operator in the vehicle 20 expectedly becomes high if the operator information is transmitted to the vehicle 20.

This is because the operator information is transmitted due to the satisfaction of at least one of the conditions (i) to (vi) of the operator information request condition, in addition to the operator information transmitted every certain time t5 due to the operator information transmission condition.

If at least one of the conditions (i) to (vi) of the operator information request condition is satisfied, in other words, if the occupant supposedly feels discomfort and insecure due to the behavior of the vehicle 20 or the like, the images of the operator are relatively frequently updated. As a result, the occupant can visually confirm the state of the operator in a manner close to real time. Since the occupant easily recognizes the operation state on his or her own, at least the occupant's sense of insecurity is suppressed.

Now, if the vehicle 20 is appropriately remotely operated (i.e. if all the conditions (i) to (vi) of the operator information request condition are not satisfied), the operator information is not transmitted from the remote operation apparatus 10 to the vehicle 20 unless the operator information transmission condition is satisfied, i.e. unless the certain time t5 elapses after the information request flag is turned "OFF" (refer to the steps S307 to S312 in FIG. 6). In other words, if the vehicle 20 is appropriately remotely operated, the transmission of the operator information is suppressed.

If the vehicle 20 is appropriately remotely operated, it is considered that the occupant does not relatively frequently look at the images of the operator. Thus, there is no problem even if transmission frequency of the operator information is suppressed. On the contrary, the operator information including the image information associated with the images of the operator has a relatively large data amount. Thus, by suppressing the transmission frequency of the operator information, it is possible to suppress a processing load of the vehicle 20 and communication traffic between the remote operation apparatus 10 and the vehicle 20.

The determination of satisfaction of the operator information request condition is performed by the state determinator 219 of the remote operation ECU 21 of the vehicle 20. Since the determination of satisfaction of the conditions (i) to (vi) of the operator information request condition, which is a condition associated with the behavior of the vehicle 20 or the like, is performed on the side of the vehicle 20, the operator information is expectedly obtained in earlier timing than when the determination of satisfaction of the conditions (i) to (vi) is performed on the side of the remote operation apparatus 10.

As illustrated in FIG. 1, the vehicle 20 is provided with the monitor ECU 22 configured to process the operator information, as another component part different from the remote operation ECU 21. It is thus possible to reduce a processing load of the remote operation ECU 21, in comparison with when the remote operation ECU 21 processes the operator information.

The "monitor 12", the "camera 151", the "remote operation ECU 21", the "monitor ECU 22", the "display unit 222", and the display 26" according to the embodiments are respectively one example of the "generator", the "imager", the "vehicle controller", the "displayer", the "display controller", and the "display apparatus" according to the present invention. The "operator information", the "remote operation control signal", the "operator information request condition", and the "certain time t5" according to the embodiment are respectively one example of the "operator information", the "control information", the "first predetermined condition", and the "predetermined time" according to the present invention. The "remote operation controller 11", the "communication controller 13", and the "state determinator 16" according to the embodiment are one example of the "controller" according to the present invention. The "controller 218" and the "state determinator 219" according to the embodiment are one example of the "requester" according to the present invention.

Second Embodiment

A remote operation system according to a second embodiment of the present invention will be explained mainly with reference to FIG. 7 and FIG. 8. In the first embodiment, the vehicle 20 is provided with the monitor ECU 22 configured to process the operator information. The second embodiment is different from the first embodiment in that the remote operation ECU processes the operator information. The other configuration is the same as that in the first embodiment. Thus, in the second embodiment, the same explanation as that in the first embodiment will be omitted, and the same parts on the drawings will carry the same reference numerals. Basically, only a different point will be explained mainly with reference to FIG. 7 and FIG. 8.

(Configuration of Vehicle)

A configuration of a vehicle according to the second embodiment will be explained with reference to FIG. 7. FIG. 7 is a block diagram illustrating the configuration of the vehicle according to the second embodiment.

A vehicle 20a according to the second embodiment is provided with a DMC 23 and a remote operation ECU 24. The remote operation ECU 24 is provided with a controller 218, a display unit 241, a communicator 242, and a state determinator 219, as a logical processing block or a physical processing circuit realized therein.

The DMC 23 is configured to obtain a remote operation control signal and operator information through the Internet (refer to FIG. 1), and is configured to output the obtained remote operation control signal and the obtained operator information to the remote operation ECU 24. The communicator 242 of the remote operation ECU 24 is configured to output the remote operation control signal to the controller 218 and to output the operator information to the display unit 241.

The display unit 241 is configured to control a display ECU 25 to display images based on the operator information. Specifically, for example, the display unit 241 is configured to transmit an image signal associated with the images based on the operator information, to the display ECU 25. The display ECU 25 is configured to control a display to display a desired image is displayed on the display (not illustrated) on the basis of the image signal.

The "controller 218" and the "display unit 241" according to the second embodiment respectively correspond to the "remote operation ECU 21" and the "monitor ECU 22" according to the first embodiment. Therefore, in the second embodiment, the "remote operation ECU" and the "monitor ECU" in FIG. 2 and FIG. 3 can be read respectively as the "controller 218" and the "display unit 241".

(Operations of Remote Operation ECU)

Next, operations of the remote operation ECU 24 will be specifically explained with reference to the flowchart in FIG. 8. The process of the step S201 to the step S215 in FIG. 8 are the same as those explained with reference to the flowchart in FIG. 5 in the first embodiment. The second embodiment, however, is different from the first embodiment in that the controller 218 communicates with the remote operation apparatus 10 via the communicator 242 and the DMC 23. Hereinafter, mainly, an explanation will be given to state transition of each of the controller 219 and the display unit 241 and process operations in a step S401 and a step S402, which are unique to the second embodiment.

Figure 8:
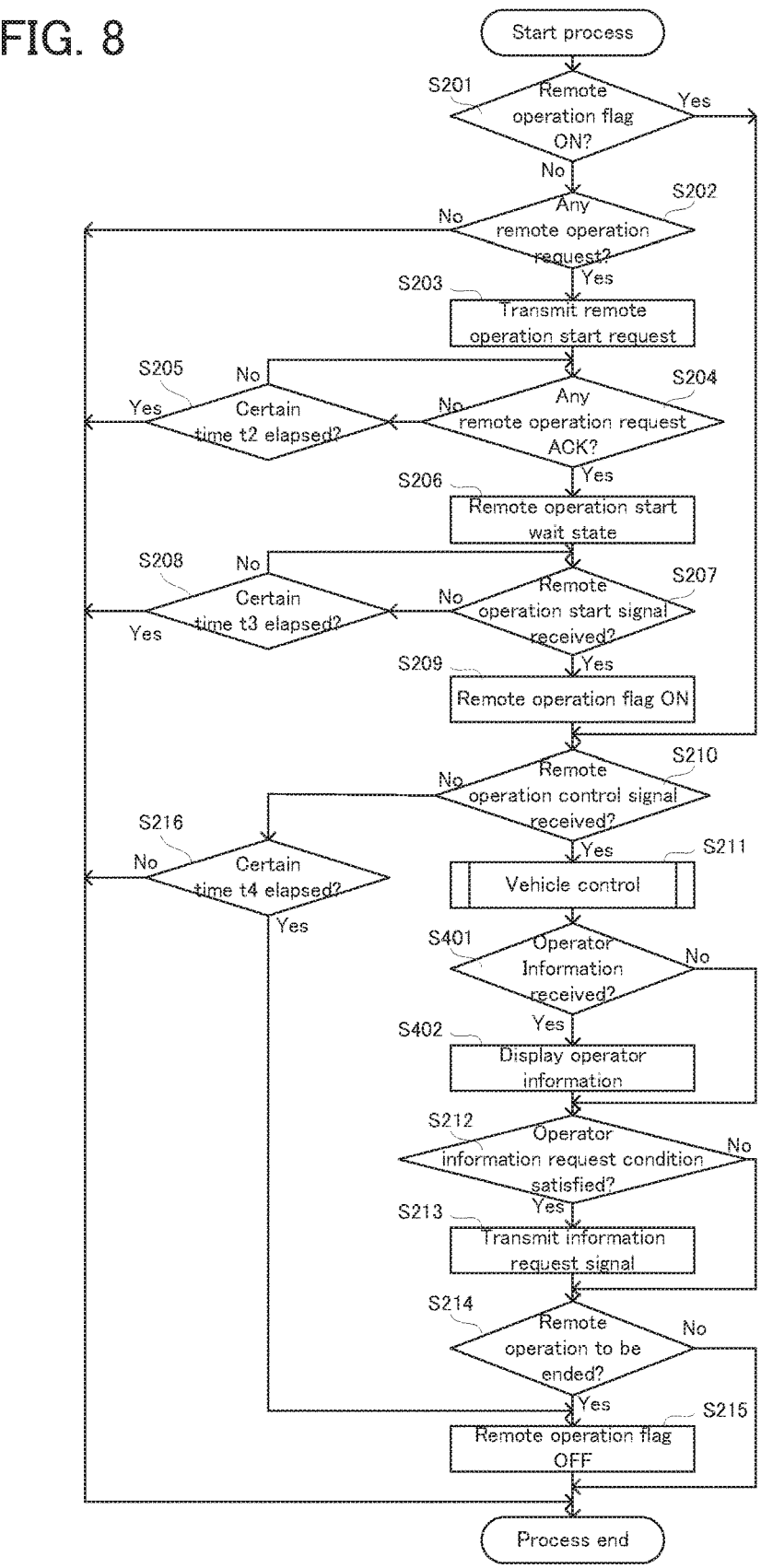
FIG. 8 is a flowchart illustrating a main part of operations of a remote operation ECU of the vehicle according to the second embodiment.

In FIG. 8, if the process of the step S203 is performed, the controller 218 moves into the request response wait state from the normal state, and transmits the request response wait state transition signal to the display unit 241. As a result, the display unit 241 moves into the operator information wait state.

In the determination in the step S204, if it is determined that the remote operation request acknowledgement is received (the step S204: Yes), the controller 218 moves into the remote operation start wait state from the request response wait state (the step S206).

In the determination in the step S205, if it is determined that the certain time t2 elapses (the step S205: Yes), the controller 218 moves into the normal state from the request response wait state, and transmits the normal state transition signal to the display unit 241. As a result, the display unit 241 moves into the normal state from the operator information wait state.

In the same manner, in the determination in the step S208, if it is determined that the certain time t3 elapses (the step S208: Yes), the controller 218 moves into the normal state from the remote operation start wait state, and transmits the normal state transition signal to the display unit 241. As a result, the display unit 241 moves into the normal state from the operator information wait state.

In the determination in the step S207, if it is determined that the remote operation start signal is received (the step S207: Yes), the controller 218 moves into the remote operation state from the remote operation start wait state, and turns "ON" the remote operation flag (the step S209).

After the process of the step S211, the display unit 241 determines whether or not the operator information is received from the remote operation apparatus 10 (step S401). In the determination, if it is determined that the operator information is received (the step S401: Yes), the display unit 241 controls the display ECU 25 to display images based on the received operator information (step S402).

In the determination in the step S401, if it is determined that the operator information is not received (the step S401: No), or after the process of the step S402, the controller 218 performs the process after the step S212. In the process of the step S214, if it is determined that the remote operation is to be ended (the step S214: Yes), the controller 218 moves into the normal state from the remote operation state, and transmits the normal state transition signal to the display unit 241. As a result, the display unit 241 moves into the normal state from the operator information wait state.

(Technical Effects)

Figure 7:
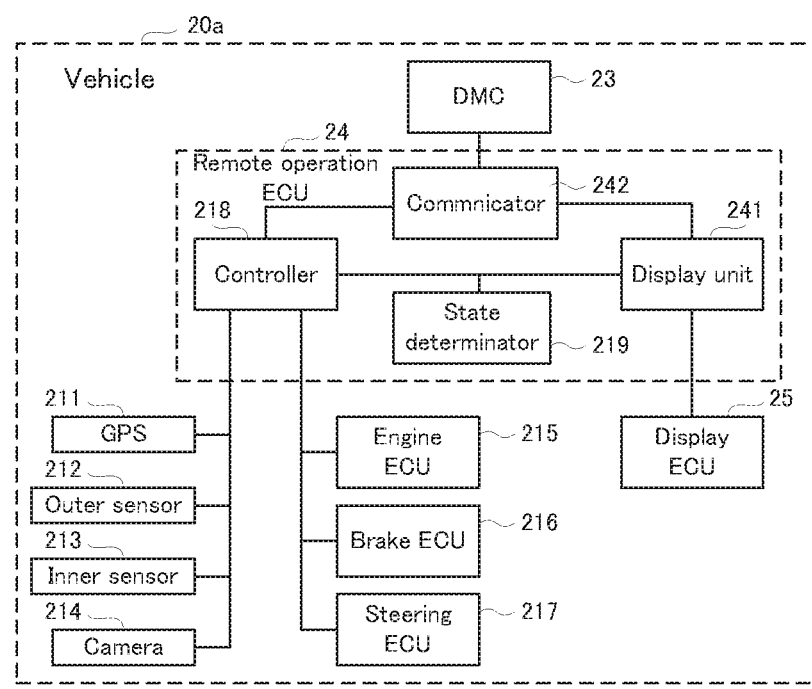
FIG. 7 is a block diagram illustrating a configuration of a vehicle according to a second embodiment.

As illustrated in FIG. 7, the remote operation ECU 24 is provided with the controller 218 configured to run the vehicle 20a on the basis of the remote operation control signal or the like, and the display unit 241 configured to process the operator information. In other words, both of the controller 218 and the display unit 241 are component parts of the remote operation ECU 24. The number of the component parts is less than that in the first embodiment. It is thus possible to improve, for example, degree of freedom in physical arrangement of the remote operation ECU 24 or the like.

The "display unit 241" according to the second embodiment is another example of the "display controller" according to the present invention.

Third Embodiment

A remote operation system according to a third embodiment of the present invention will be explained mainly with reference to FIG. 9. In the first embodiment, the determination of satisfaction of the operator information request condition is performed on the side of the vehicle 20. In the third embodiment, the conditions (i) to (vi) of the operator information request condition are included in the operator information transmission condition. In other words, the third embodiment is different from the first embodiment in that the determination of satisfaction of the operator information request condition is performed on the side of the remote operation apparatus 10 (in association with which, the remote operation ECU 21 of the vehicle 20 is not necessarily provided with the state determinator 219). The other configuration is the same as that of the first embodiment. Thus, in the third embodiment, the same explanation as that in the first embodiment will be omitted, and the same parts on the drawing will carry the same reference numerals. Basically, only a different point will be explained mainly with reference to FIG. 9.

In the third embodiment, instead of the "information request flag" according to the first embodiment, an "information transmission flag" is used. An initial value of the "information transmission flag" is "OFF".

(Operations of Remote Control Apparatus)

Figure 9:
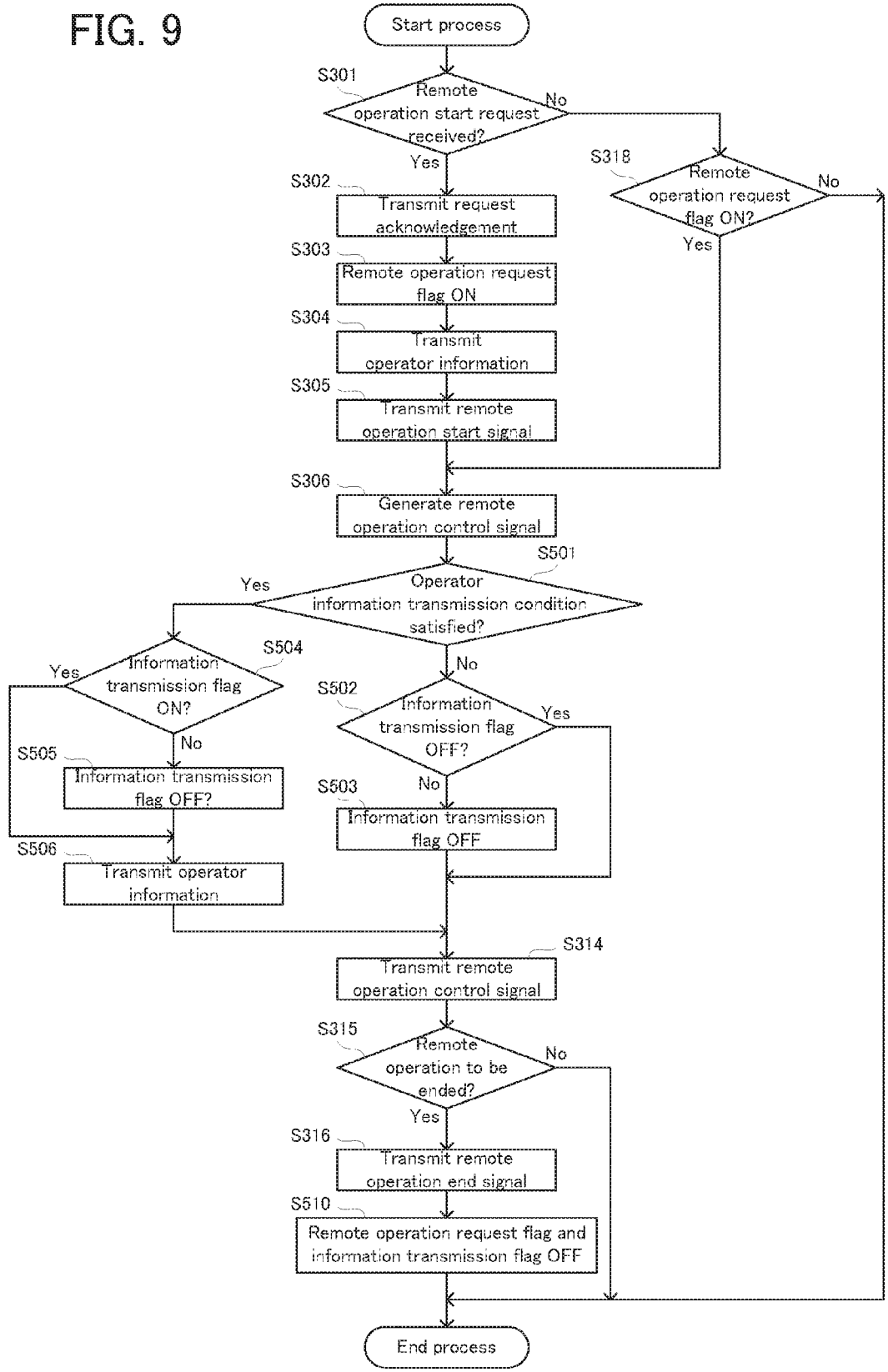
FIG. 9 is a flowchart illustrating operations of a remote operation apparatus according to a third embodiment.

In FIG. 9, after the process of the step S306, the remote operation controller 11 of the remote operation apparatus 10 determines whether or not the operator information transmission condition is satisfied (step S501). The operator information transmission condition according to the third embodiment includes not only a condition that "the certain time t5 elapses after the information transmission flag is turned "OFF"", but also the conditions that "the acceleration of the vehicle 20 exceeds an acceleration threshold value, or the deceleration of the vehicle 20 exceeds a deceleration threshold value", that "the stop time exceeds a stop time threshold value, wherein the stop time is a time length from a time point at which the color of a traffic light closest to the vehicle 20 changes from red to blue on the course of the vehicle 20", that "the extent of wandering of the vehicle exceeds an allowable range", that "the TTC exceeds a TTC threshold value, wherein the TTC is obtained from a distance between the vehicle 20 and a vehicle running immediately ahead of the vehicle 20", that "the yaw rate of the vehicle 20 exceeds a yaw rate threshold value", and that "the value indicating the obstacle surrounding the vehicle 20 exceeds a surrounding obstacle threshold value".

The operator information transmission condition is set in the above manner, and thus, the remote operation ECU 21 of the vehicle 20 according to the third embodiment does not perform the process of the step S212 and the step S213 in the flowchart in FIG. 5.

The state determinator 16 outputs a determination result indicating that the operator information transmission condition is satisfied, if at least one of the seven conditions as the operator information transmission condition is satisfied. On the other hand, the state determinator 16 outputs a determination result indicating that the operator information transmission condition is not satisfied, if all the seven conditions are not satisfied. The remote operation controller 11 determines whether or not the operator information transmission condition is satisfied, on the basis of the determination result of the state determinator 16.

In the determination in the step S501, if it is determined that the operator information transmission condition is not satisfied (the step S501: No), the remote operation controller 11 determines whether or not the information transmission flag is "OFF" (step S502). In the determination, if it is determined that the information transmission flag is not "OFF" (i.e. if it is determined that the information transmission flag is "ON") (the step S502: No), the remote operation controller 11 turns "OFF" the information transmission flag (step S503).

In the determination in the step S502, if it is determined that the information transmission flag is "OFF" (the step S502: Yes), or after the process of the step S503, the remote operation controller 11 transmits the remote operation control signal to the vehicle 20 via the communication controller 13 (the step S314).

In the determination in the step S501, if it is determined that the operator information transmission condition is satisfied (the step S501: Yes), the remote operation controller 11 determines whether or not the information transmission flag is "ON" (step S504). In the determination, if it is determined that the information transmission flag is not "ON" (i.e. if it is determined that the information transmission flag is "OFF") (the step S504: No), the remote operation controller 11 turns "ON" the information transmission flag (step S505).

In the determination in the step S504, if it is determined that the information transmission flag is "ON" (the step S504: Yes), or after the process of the step S505, the remote operation controller 11 controls the monitor 12 to transmit the operator information to the vehicle 20 (step S506). Then, the remote operation controller 11 transmits the remote operation control signal to the vehicle 20 via the communication controller 13 (the step S314).

After the process of the step S314, the remote operation controller 11 determines whether or not the remote operation is to be ended (the step S315). In the determination, if it is determined that the remote operation is to be ended (the step S315: Yes), the remote operation controller 11 transmits the remote operation end signal to the vehicle 20 via the communication controller 13 (the step S316), turns "OFF" the remote operation request flag and the information transmission flag (step S510), and ends the process.

(Technical Effects)

Particularly in the third embodiment, the determination of satisfaction of the operator information transmission condition is performed by the state determinator 16 of the remote operation apparatus 10, and the determination of satisfaction of the condition associated with the transmission of the operator information is not performed on the side of the vehicle 20. It is thus possible to reduce the processing load of the remote operation ECU 21 of the vehicle, in comparison with the first embodiment.

The "operator information transmission condition" according to the third embodiment is one example of the "second predetermined condition" according to the present invention.

Fourth Embodiment

A remote operation system according to a fourth embodiment of the present invention will be explained mainly with reference to FIG. 10. In the fourth embodiment, as in the aforementioned second embodiment, the remote operation ECU processes the operator information (i.e. a vehicle according to the fourth embodiment is not provided with the "monitor ECU 22" according to the first embodiment). A remote operation apparatus according to the fourth embodiment has the same configuration as that of the remote operation apparatus according to the third embodiment. In other words, an operator information transition condition according to the fourth embodiment includes the "conditions (i) to (vi) of the operator information request condition" according to the first embodiment. Moreover, in the fourth embodiment, the determination of satisfaction of the operator information request condition is not performed on the vehicle side.

Therefore, the vehicle according to the fourth embodiment has the same configuration as that of the vehicle 20a according to the second embodiment described above and illustrated in FIG. 7. The vehicle according to the fourth embodiment is not necessarily provided with the state determinator 219. The remote operation apparatus according to the fourth embodiment performs the same operations as those of the remote operation apparatus according to the third embodiment illustrated in the flowchart in FIG. 9. The other configuration is the same as that in the first embodiment.

Thus, the same explanation as those in the first to third embodiments will be omitted, and the same parts on the drawing will carry the same reference numerals. Basically, only a different point will be explained mainly with reference to FIG. 10.

(Operations of Remote Operation ECU)

Figure 10:
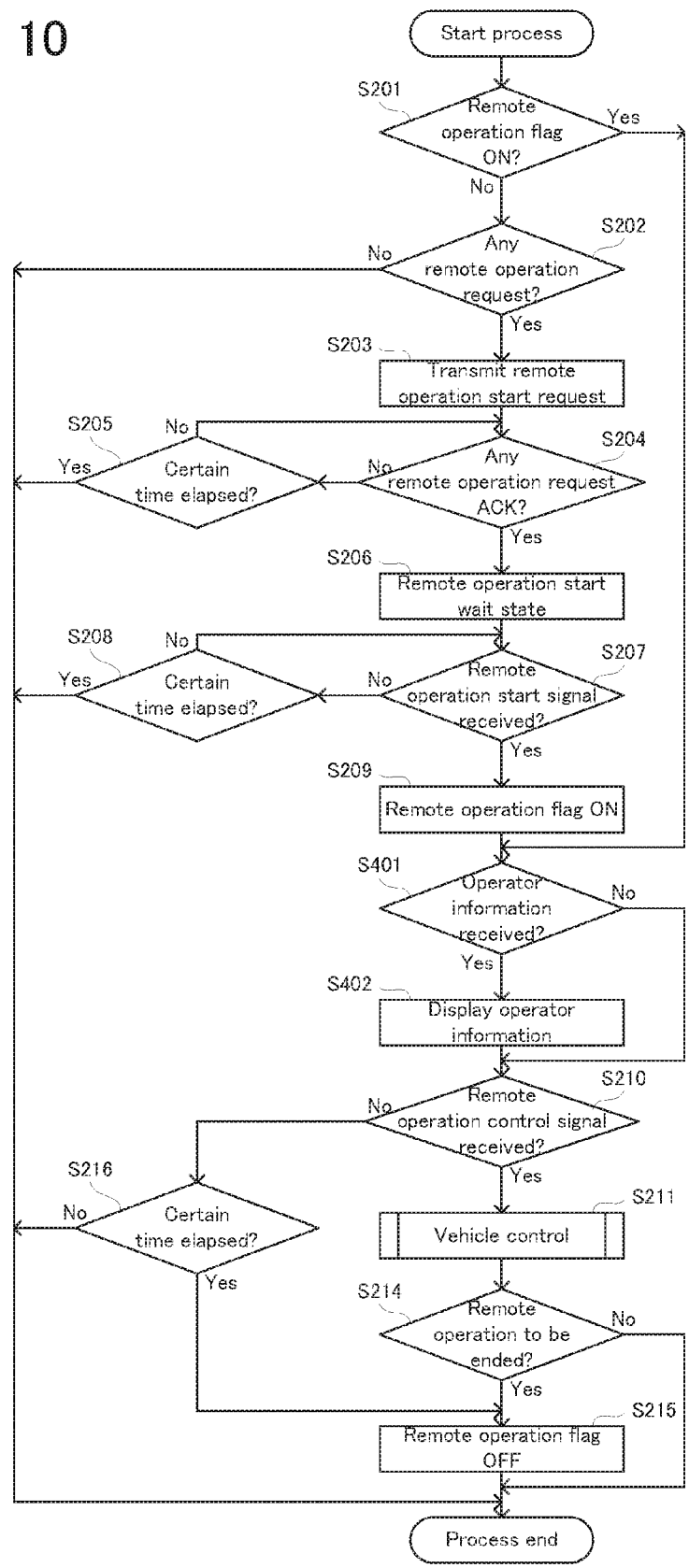
FIG. 10 is a flowchart illustrating operations of a remote operation ECU of a vehicle according to a fourth embodiment.

In FIG. 10, in the determination in the step S207, if it is determined that the remote operation start signal is received (the step S207: Yes), the display unit 241 of the remote operation ECU 24 of the vehicle 20a (refer to FIG. 7) determines whether or not the operator information is received from the remote operation apparatus 10 (the step S401). In the determination, if it is determined that the operator information is received (the step S401: Yes), the display unit 241 controls the display ECU 25 to display the images based on the operator information received (the step S402).

In the determination in the step S401, if it is determined that the operator information is not received (the step S401: No), or after the process of the step S402, the controller 218 determines whether or not the remote operation control signal is received from the remote operation apparatus 10 (the step S210).

Please note that particularly in the fourth embodiment, the flowchart in FIG. 10 does not include the process operations in the step S212 and the step S213 in the flowchart in FIG. 5.

(Technical Effects)

In the fourth embodiment, as in the aforementioned third embodiment, the determination of satisfaction of the operator information transmission condition is performed on the side of the remote operation apparatus 10, and is not performed on the side of the vehicle 20a. It is thus possible to reduce a processing load of the remote operation ECU 24 of the vehicle 20a.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A remote operation system including: a remote operation apparatus; and a vehicle, which is an operation target of the remote operation apparatus, wherein both of the remote operation apparatus and the vehicle are capable of communicate with each other,
the remote operation apparatus comprises:
an imager configured to successively photograph an operator of the remote operation apparatus;
a generator configured to generate operator information, which is information about the operator and which includes images of the operator outputted from the imager; and
a controller configured to generate control information, which is information for remotely operating the vehicle, and to transmit the control information and the operator information to the vehicle, and
the vehicle comprises:
a vehicle controller configured to control the vehicle on the basis of the transmitted control information; and
a displayer configured to display images based on the transmitted operator information.

2. The remote operation system according to claim 1, wherein the vehicle further comprises a requester configured to request the remote operation apparatus to transmit the operator information, on condition that an index indicating a state of the vehicle satisfies a first predetermined condition.

3. The remote operation system according to claim 1, wherein the controller transmits the operator information to the vehicle, on condition that a predetermined time elapses after the operator information is previously transmitted.

4. The remote operation system according to claim 1, wherein the controller transmits the operator information to the vehicle, on condition that a predetermined time elapses after the operator information is previously transmitted, or on condition that an obtained index indicating a state of the vehicle satisfies a second predetermined condition.

5. The remote operation system according to claim 2, wherein the index indicating the state of the vehicle is at least one of acceleration, deceleration, a yaw rate, a stop time, a time to collision, an extent of wandering of the vehicle, and an extent of an obstacle surrounding the vehicle.

6. The remote operation system according to claim 1, wherein the displayer keeps displaying the images based on the present operator information until the operator information is newly received.

7. The remote operation system according to claim 1, wherein
the displayer includes a display apparatus and a display controller configured to control the display apparatus, and
the display controller is configured separately from the vehicle controller.

8. The remote operation system according to claim 1, wherein
the displayer includes a display apparatus and a display controller configured to control the display apparatus, and
the display controller is configured integrally with the vehicle controller.

9. A vehicle, which is an operation target of an external remote operation apparatus, comprising:
a vehicle controller configured to obtain control information, which is information for remotely operating the vehicle, from the remote operation apparatus and to control the vehicle on the basis of the control information; and
a displayer configured to obtain operator information, which is information about an operator of the remote operation apparatus and which includes images of the operator, from the remote operation apparatus and to display images based on the operator information.

10. The vehicle according to claim 9, further comprising a requester configured to request the remote operation apparatus to transmit the operator information, on condition that an index indicating a state of the vehicle satisfies a first predetermined condition.

11. The vehicle according to claim 10, wherein the index indicating the state of the vehicle is at least one of acceleration, deceleration, a yaw rate, a stop time, a time to collision, an extent of wandering of the vehicle, and an extent of an obstacle surrounding the vehicle.

12. The vehicle according to claim 9, wherein the displayer keeps displaying the images based on the present operator information until the operator information is newly received.

13. The vehicle according to claim 9, wherein
the displayer includes a display apparatus and a display controller configured to control the display apparatus, and
the display controller is configured separately from the vehicle controller.

14. The vehicle according to claim 9, wherein
the displayer includes a display apparatus and a display controller configured to control the display apparatus, and
the display controller is configured integrally with the vehicle controller.

15. A remote operation apparatus configured to remotely operate a vehicle, the remote operation apparatus comprising:
an imager configured to successively photograph an operator of the remote operation apparatus;
a generator configured to generate operator information, which is information about the operator and which includes images of the operator outputted from the imager; and
a controller configured to generate control information, which is information for remotely operating the vehicle, and to transmit the control information and the operator information to the vehicle.

16. The remote operation apparatus according to claim 15, wherein the controller transmits the operator information to the vehicle, on condition that a predetermined time elapses after the operator information is previously transmitted.

17. The remote operation apparatus according to claim 15, wherein the controller transmits the operator information to the vehicle, on condition that an obtained index indicating a state of the vehicle satisfies a second predetermined condition.

18. The remote operation apparatus according to claim 17, wherein the index indicating the state of the vehicle is at least one of acceleration, deceleration, a yaw rate, a stop time, a time to collision, an extent of wandering of the vehicle, and an extent of an obstacle surrounding the vehicle.

* * * * *